United States Patent [19]
Yu

[11] Patent Number: 6,079,835
[45] Date of Patent: Jun. 27, 2000

[54] ADJUSTABLE LASER PROJECTOR

[75] Inventor: Ting-Li Yu, Taipei, Taiwan

[73] Assignee: Acropro, Inc., Taiwan

[21] Appl. No.: 09/115,145

[22] Filed: Jul. 14, 1998

[51] Int. Cl.[7] .................................................. G03B 21/28
[52] U.S. Cl. ............................ 353/119; 353/51; 359/201
[58] Field of Search .................................. 353/42, 46, 48,
353/49, 50, 98, 51, 99; 359/197, 198, 200,
201, 212

[56] References Cited

U.S. PATENT DOCUMENTS

| | | | |
|---|---|---|---|
| 3,767,299 | 10/1973 | Fisher | 353/38 |
| 5,024,494 | 6/1991 | Williams et al. | 353/42 |
| 5,196,875 | 3/1993 | Stiickler | 353/46 |
| 5,400,514 | 3/1995 | Imbrie et al. | 353/43 |
| 5,450,148 | 9/1995 | Shu et al. | 353/42 |
| 5,526,076 | 6/1996 | Walker | 353/43 |
| 5,864,417 | 1/1999 | Ho | 359/201 |
| 5,870,219 | 2/1999 | Plesko | 359/199 |
| 5,920,140 | 7/1999 | Nakagishi et al. | 359/198 |

*Primary Examiner*—William Dowling
*Attorney, Agent, or Firm*—Dorsey & Whitney LLP

[57] ABSTRACT

An adjustable laser projector has a reflection seat for receiving and reflecting a laser beam, and an adjusting means pivotally mounted on the reflector for adjusting a projecting point of the laser without changing an incidence point, such that even though the angle of the projection of a laser beam is changed, the laser projector is still able to accurately receive the laser beam.

5 Claims, 8 Drawing Sheets

ADJUSTABLE LASER PROJECTOR

BACKGROUND OF THE INVENTION

1. Field of the Invention

The present invention relates to an adjustable laser projector, and more particularly to a laser projector which is able to readily facilitate adjusting a projecting point without changing an incidence point.

2. Description of Related Art

A laser projector is generally used at a party, dance or performance to initiate and maintain a lively atmosphere. Laser beams are projected to generate patterns on a wall or a screen.

A conventional laser projector 40 shown in FIG. 8 has a seat 42. Two scan mirrors 44 are respectively perpendicularly and horizontally mounted in the seat 42. Two brackets 48 are formed on a bottom of the seat 42 for supporting it. The scan mirrors 44 are controllably rotated by a user so that the laser beam is projected at various angles to generate different patterns.

The laser beam does not directly come from a light source but passes through a plurality of turning mirrors 50, 52 to be directed into the projector 40. To maintain the angle of incidence and reflection, these devices are all fixedly mounted on ground or a desktop. Therefore, the laser beam is projected at a fixed point. When changing the position of the laser projector 40 is necessary, it is necessary to correspondingly adjust the turning mirrors 50, 52 for the laser beam to have the best projection result. Whereby, the adjustment of a conventional laser projector 40 is inconvenient and time-consuming.

Thus, an adjustable laser projector in accordance with the present invention tends to mitigate and/or obviate the aforementioned problem.

SUMMARY OF THE INVENTION

The main object of the present invention is to provide an adjustable laser projector for changing a projecting angle of a laser while keeping the incidence point of laser unchanged.

Other objects, advantages and novel features of the invention will become more apparent from the following detailed description when taken in conjunction with the accompanying drawings.

DETAILED DESCRIPTION OF THE PREFERRED EMBODIMENT

Figure 1:
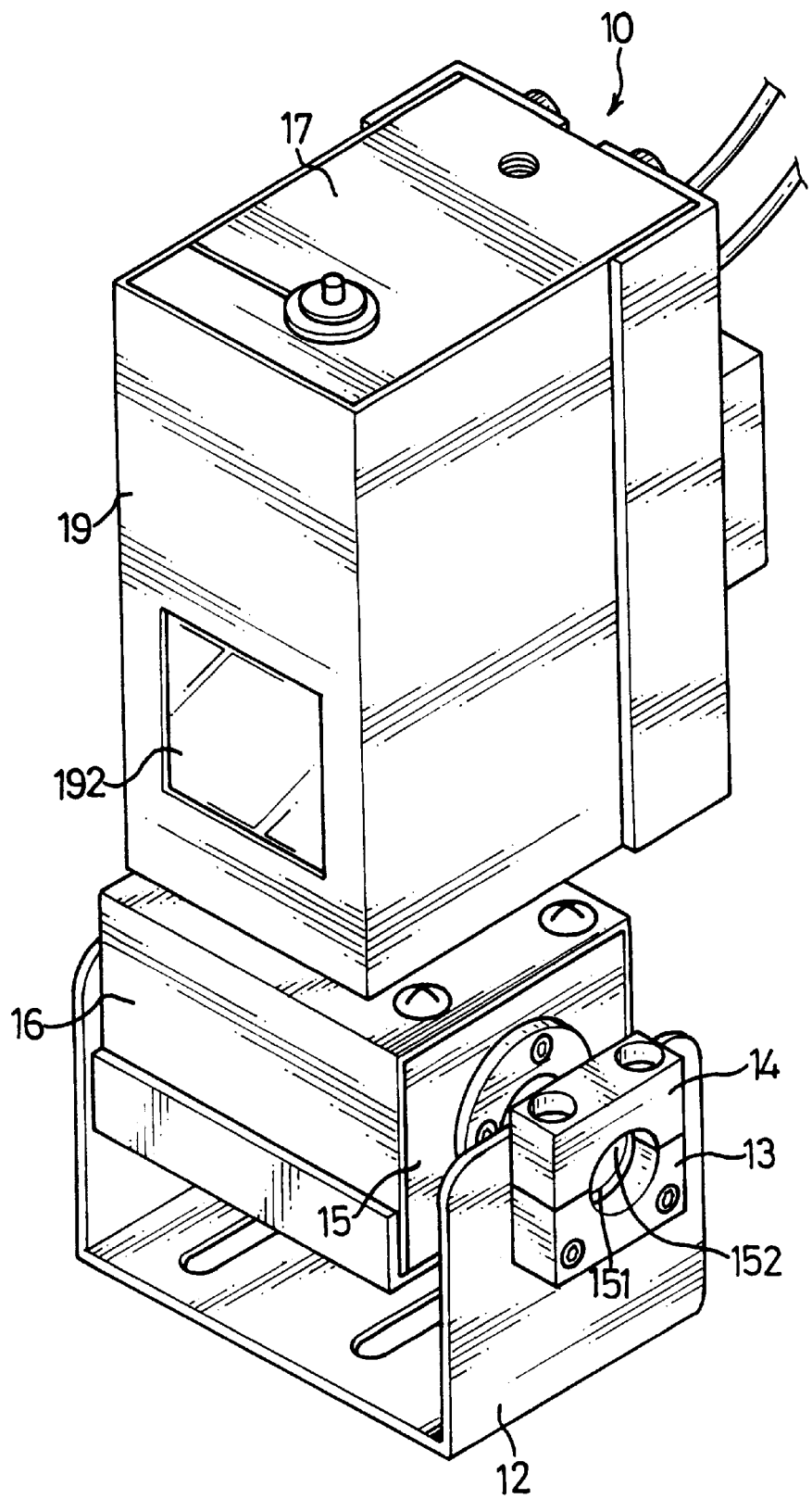
FIG. 1 is a perspective view of a preferred embodiment of the present invention.

FIG. 1 shows a preferred embodiment of the present invention. An adjustable laser projector 10 is constructed to have a base 12, an incidence seat 15 pivotally mounted on the base 12 and a reflection seat 17 securely mounted onto the incidence seat 15.

Figure 2:
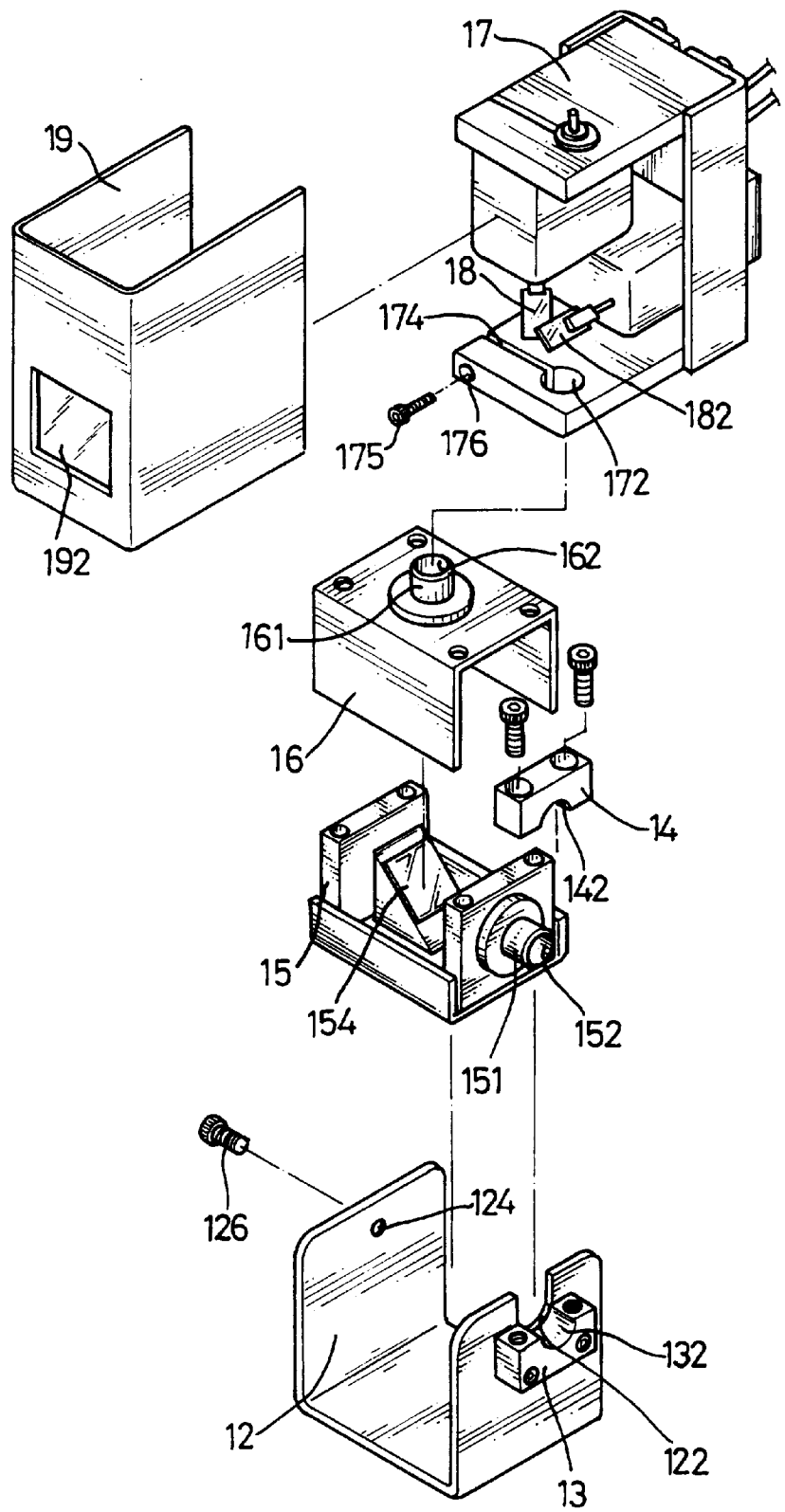
FIG. 2 is an exploded view of the preferred embodiment of the present invention.

Referring to FIG. 2, the base 12 has an notch 122 defined in an end face thereof. A bracket 13 mounted on the end face of the base 12 has a semicircular recess 132 defined therein and corresponding to the notch 122. A cap 14 which also has a semicircular recess 142 is detachably mounted on the bracket 13 so as that the semicircular recess 132 of the bracket 13 and the semicircular recess 142 of the cap 14 corporately define an opening (not numbered) therebetween. An aperture 124 is defined in an end face for receiving a bolt 126.

The incidence seat 15 has a first tube 151 formed on an end face. The first tube 151 defines an inlet 152 therethrough. A mirror 154 is securely and inclinedly mounted on the incidence seat 15. In this case, a slope of the mirror 154 is 45°. Light can reach the mirror 154 through the inlet 152 of the first tube 151. A hood 16 covers the incidence seat 15. A second tube 161 defining an outlet 162 therethrough is formed on a top face of the hood 16. Receiving the first tube 151 within the opening defined by the bracket 13 and the cap 14, the incidence seat 15 can be pivotally mounted on the U-shaped base 12, while the incidence seat 15 can also be fixed at any angle by the bolt 126.

The reflection seat 17 has a hole 172 defined in a bottom portion thereof for receiving the second tube 161 therein. A channel 174 also defined in the bottom portion of the reflection seat 17 communicates with the hole 172. The channel 174 can be properly secured by threadingly inserting a screw 175 into a threaded hole 176 defined in the bottom of the reflection seat 17 and in communication with the channel 174. A scan mirror 182 mounted in the reflection seat 17 is aligned with the hole 172. Another scan mirror 18 mounted on the reflection seat 17 is perpendicular to the scan mirror 182. There is a housing 19 covering the reflection seat 17. The housing 19 has a lens 192 provided on a front end face relative to the scan mirror 18.

Figure 3:
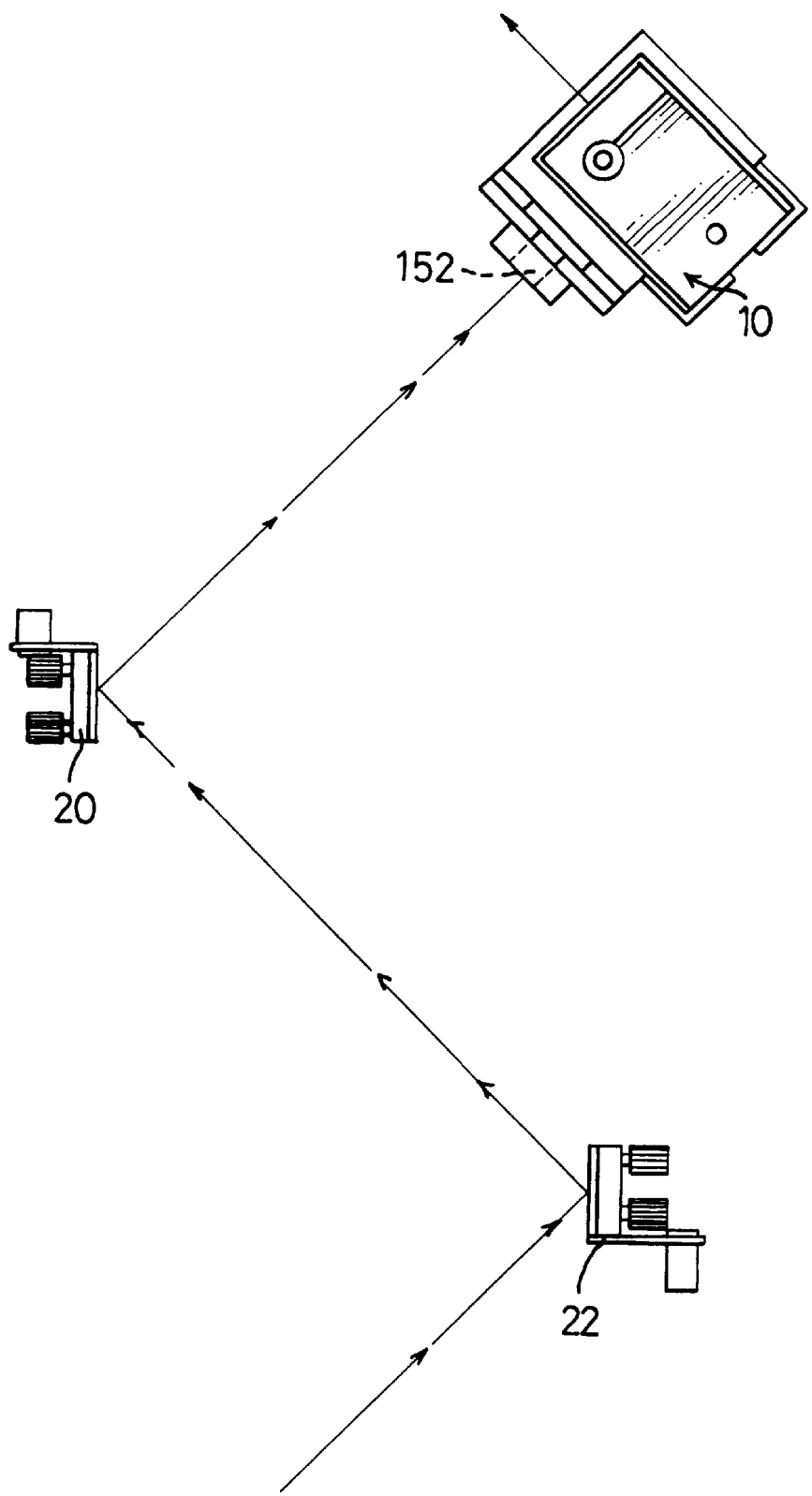
FIG. 3 is a schematic view showing a laser beam being directed into the projector.
Figure 4:
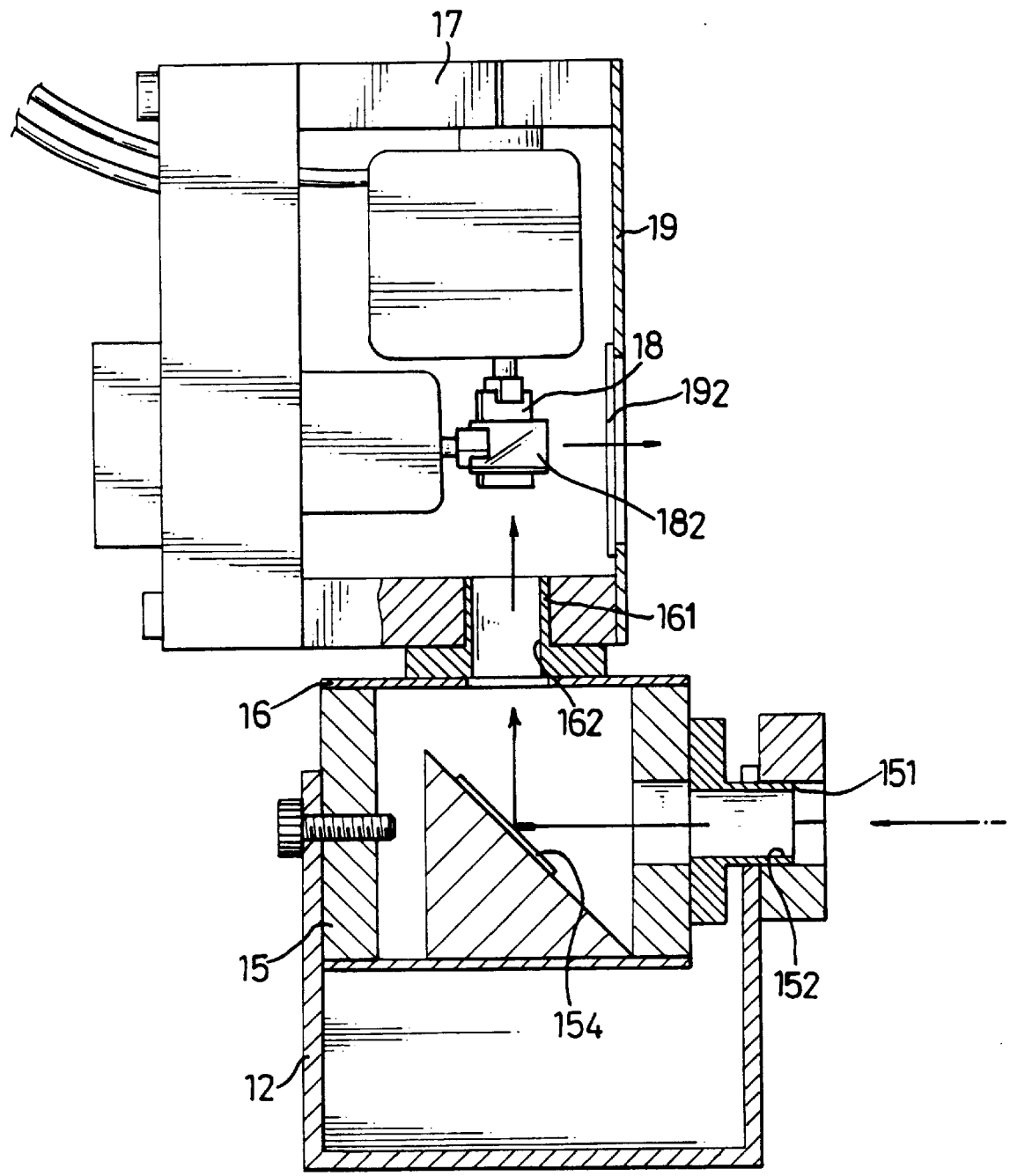
FIG. 4 is a schematic sectional view showing the laser projector of the present invention.

In use, a laser beam is directed to the laser projector 10 through two turning mirror 22, 20 and the inlet 152, as shown in FIG. 3. Referring to FIG. 4, the projected laser beam is firstly reflected by the mirror 154 and directed into the reflection seat 17 through the outlet 162. The laser beam directed into the reflection seat is further reflected via the scan mirror 182, 18 and outwardly projected via the lens 192.

Figure 6:
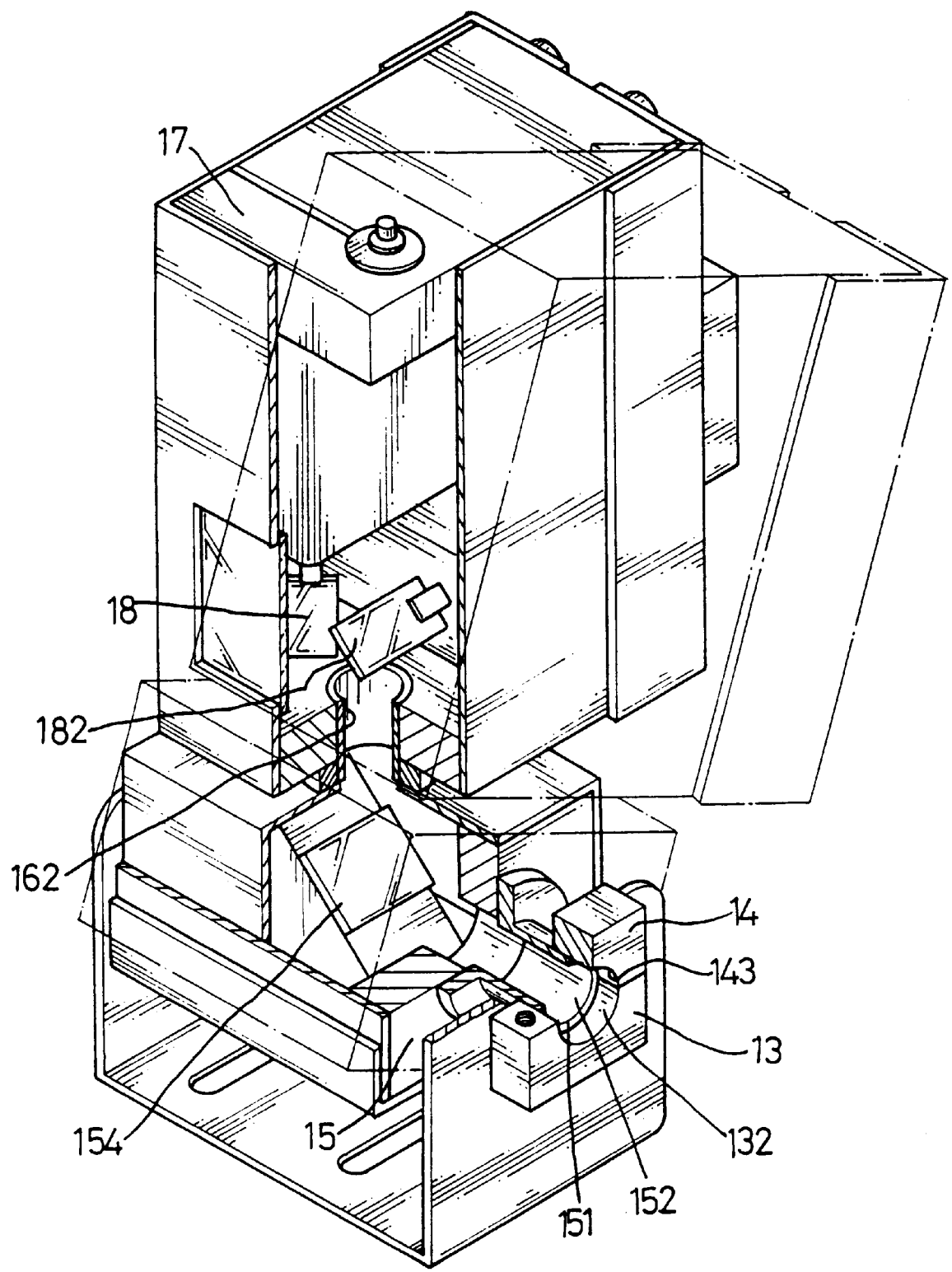
FIG. 6 is a schematic view showing a incidence seat of the projector being pivoted.
Figure 7:
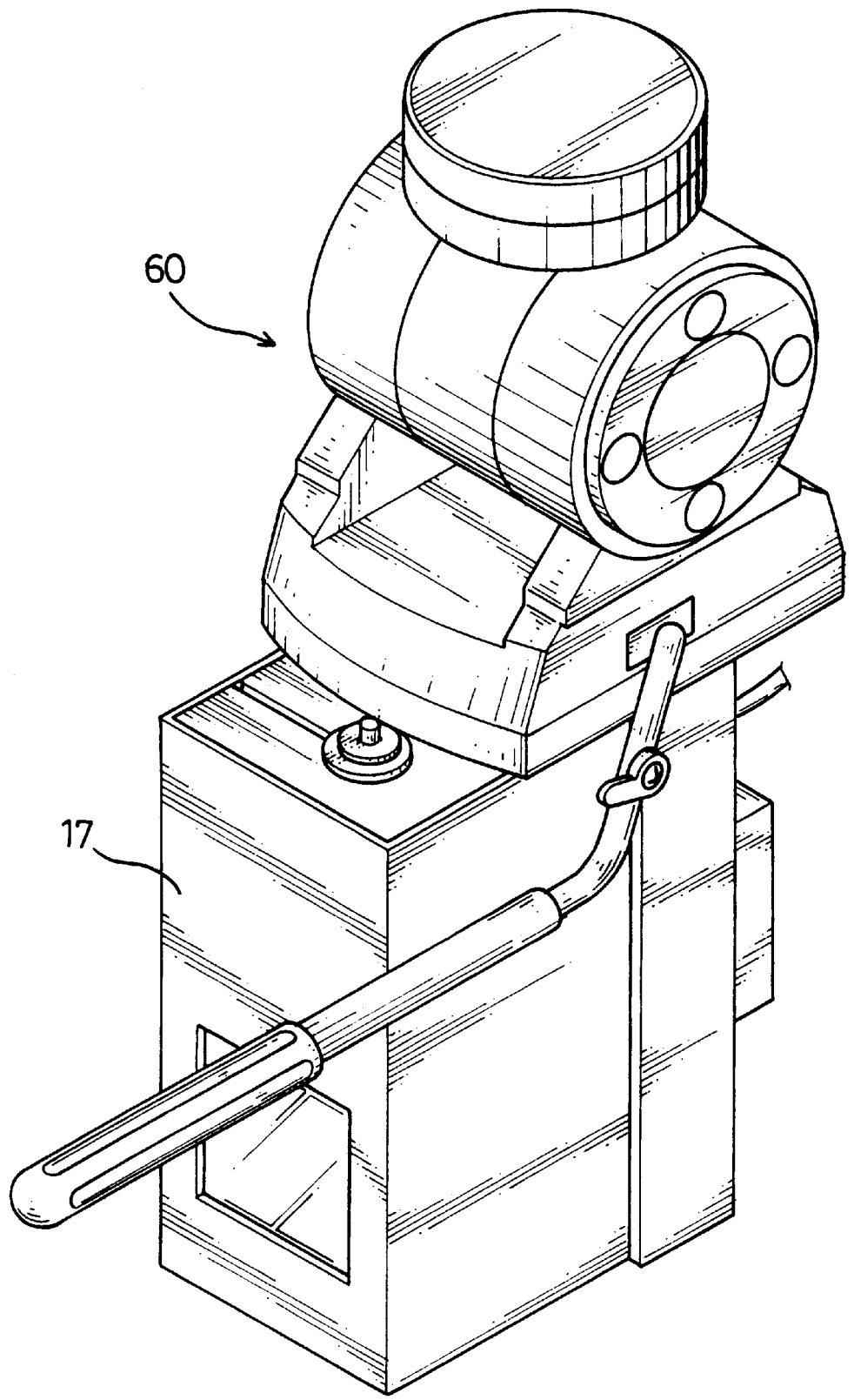
FIG. 7 is another preferred embodiment of the present invention.

When the incidence seat 15 is pivoted with respect to the base 12, the laser beam is still accurately projected into the inlet 152 along an original path, and the projecting position of the laser beam will be vertically moved due to the mirror 154 being rotated by an angle with the base 12. FIG. 6 shows a state of the incidence seat 15 being turned an angle and the projected laser beam being vertically moved.

Figure 5:
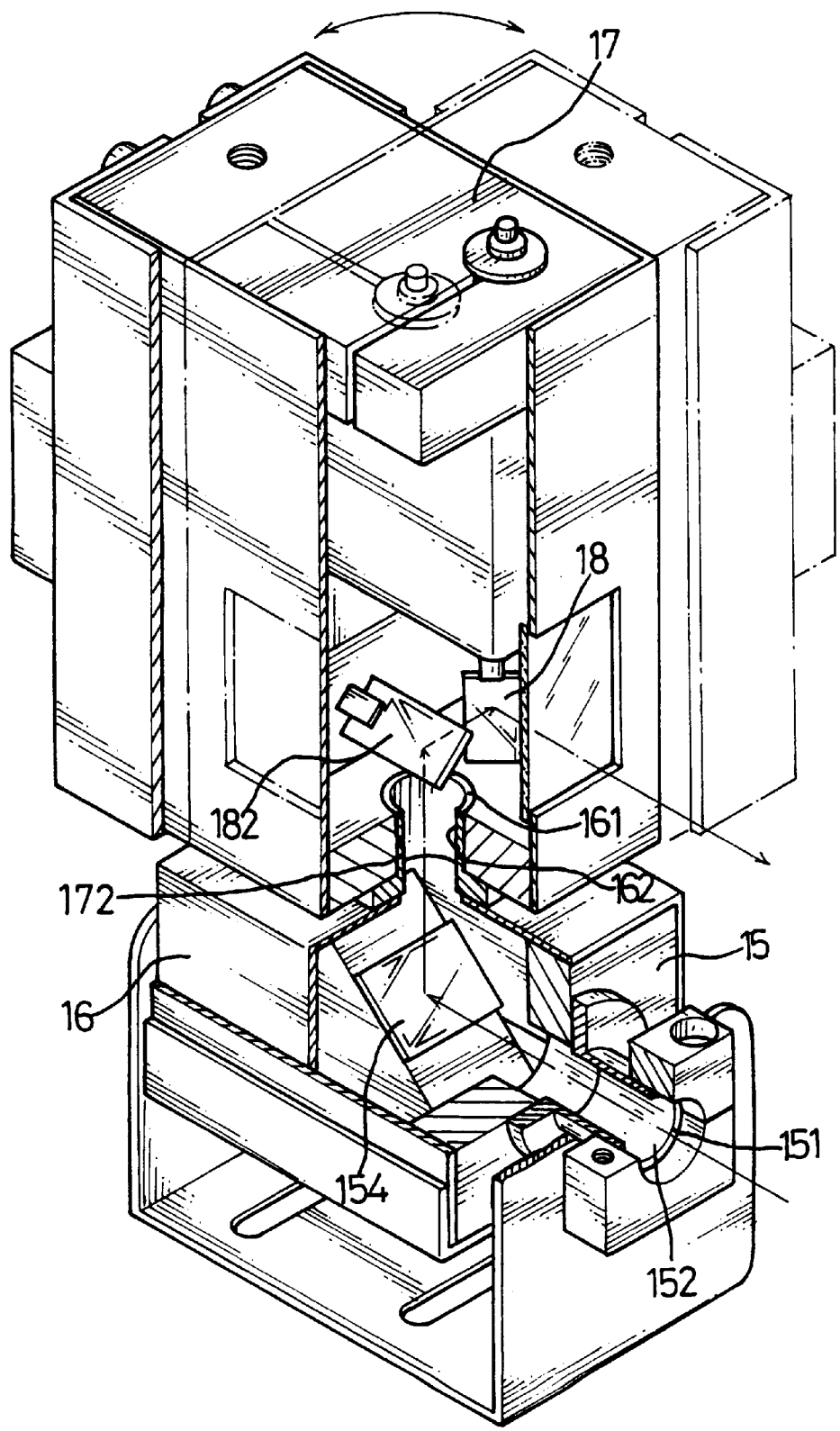
FIG. 5 is a schematic view showing a reflection seat of the projector being pivoted.

When the reflection seat 17 is pivoted with respect to the incidence seat 15, the laser beam is still accurately injected into the outlet 162 along an original path, and the projecting position of the laser beam will be horizontally moved due to the scan mirror 182, 18 being rotated an angle with the reflection seat 17. FIG. 5 shows a state of the reflection seat 17 being turned an angle and the projected laser beam being horizontally moved. By both pivoting the incidence seat 15 and the reflector 17, the laser beam will be freely projected to any position. (reference numerals should be added to the element specified)

Figure 8:
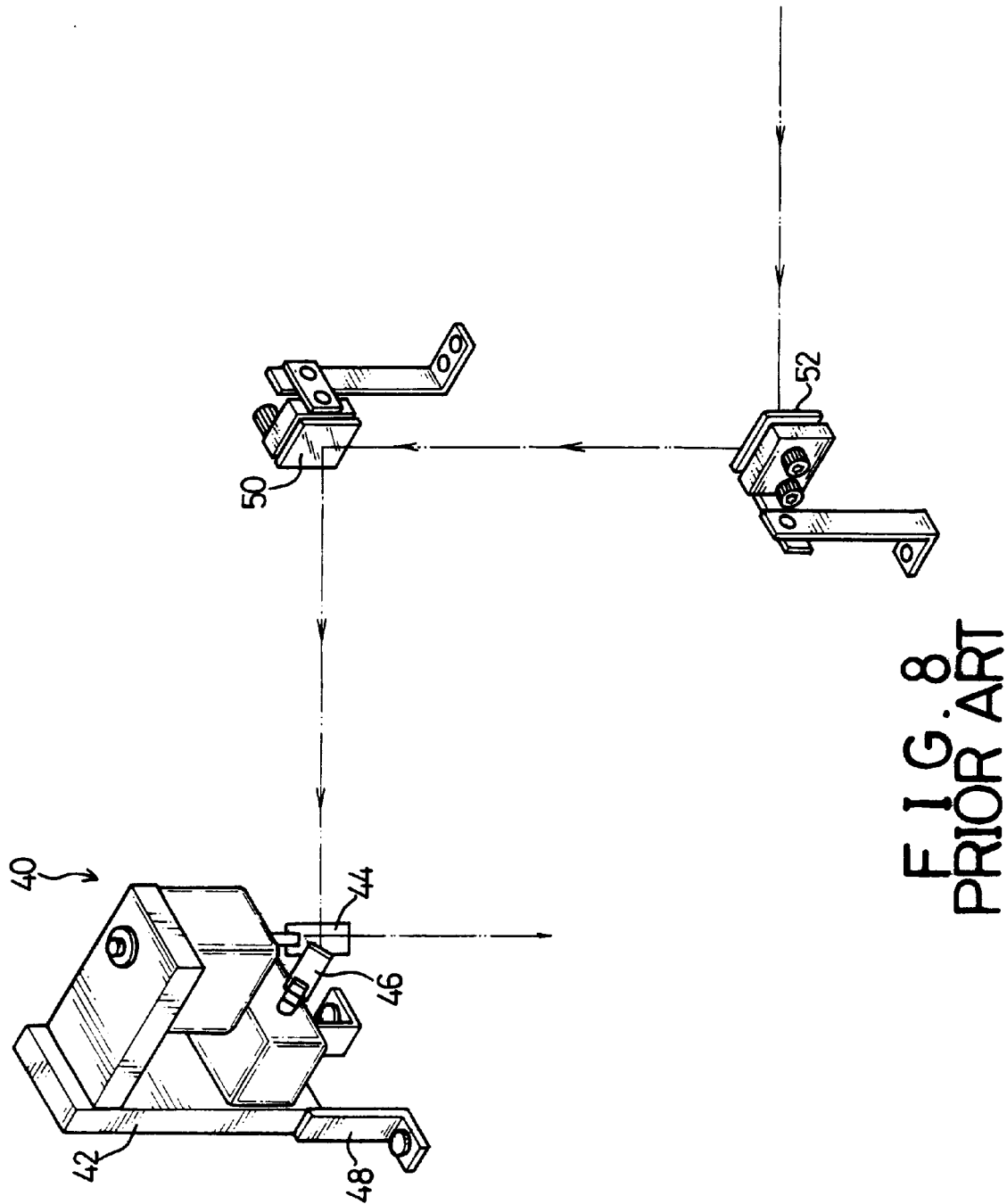
FIG. 8 is perspective view of a conventional laser projector.

FIG. 8 shows another preferred embodiment of the present invention. The base 12 and the incidence seat 15 are replaced with a frame 60. The reflection seat 17 can be hanged on the frame 60 and pivoted about the frame 60. By this way, the laser beam will be projected to any position with injecting into the reflection seat 17 along an original path.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adjustable laser projector comprising:
    a reflection seat having:
        a hole defined in a bottom portion for receiving a laser beam;
        two scan mirrors securely and perpendicularly mounted to each other in the reflection seat thereof, a first one of the scan mirrors being aligned with the hole for receiving the laser beam coming from the hole;
        a housing covering the body and having a lens formed to correspond to a first one of the scan mirrors; and
        an adjusting means provided for pivotally supporting the reflection seat so as to adjust an orientation of the reflection seat as well as the orientation of the laser beam projected from the first scan mirror;
        a channel defined to communicate with the hole, and
        a thread hole defined through the channel so as that a diameter of the hole is able to be adjusted.

2. The adjustable laser projector as claimed in claim 1, wherein the adjusting means having:
    a U-shaped base having:
        a notch defined in an end face;
        a bracket defining a semi-circular recess to correspond to the notch; and
        a cap detachably mounted on the bracket and having a semicircular recess defined to correspond to the semicircular recess of the bracket, thereby an opening is defined between the semicircular recesses; and
    an incidence seat having:
        a first tube formed to be pivotally received in the opening and defining an inlet through the first tube;
        a mirror mounted to correspond to the inlet and the second scan mirror; and
        a hood covering the incidence seat having a second tube formed to be pivotally received in the hole of the reflection seat and having an outlet whereby the laser beam received from the inlet of the first tube is able to be reflected by the mirror of the incidence seat to the second scan mirror.

3. The adjustable laser projector as claimed in claim 2, wherein the base has an aperture defined for selectively securing the incidence seat.

4. The adjustable laser projector as claimed in claim 2, wherein the mirror of the incidence seat is at an inclination of 45°.

5. The adjustable laser projector as claimed in claim 1, wherein the adjusting means is a frame provided for pivotally hanging the reflection seat.

* * * * *